United States Patent [19]

Van Dine

[11] 4,041,210
[45] Aug. 9, 1977

[54] PRESSURIZED HIGH TEMPERATURE FUEL CELL POWER PLANT WITH BOTTOMING CYCLE

[75] Inventor: Leslie L. Van Dine, Manchester, Conn.

[73] Assignee: United Technologies Corporation, Hartford, Conn.

[21] Appl. No.: 719,049

[22] Filed: Aug. 30, 1976

[51] Int. Cl.² .............................................. H01M 8/06
[52] U.S. Cl. ......................................... 429/16; 429/19
[58] Field of Search ............................. 429/19, 20, 16

[56] References Cited

U.S. PATENT DOCUMENTS 3,982,962  9/1976  Bloomfield ............................ 429/19

Primary Examiner—John H. Mack
Assistant Examiner—H. A. Feeley
Attorney, Agent, or Firm—Stephen E. Revis

[57] ABSTRACT

A power plant for the generation of electricity utilizes high temperature fuel cells, such as molten carbonate fuel cells, as its main power supply. Part of the oxidant exhaust stream from the fuel cell is recycled through the fuel cell. Waste energy from the fuel cell in the form of exhaust gases, such as part of the oxidant exhaust, drives a turbocharger for compressing the oxidant used in the fuel cell. In a preferred embodiment the oxidant exhaust also is the source of energy for powering a bottoming cycle, such as a steam driven turbogenerator. Power plant efficiency is improved by making maximum use of the energy and heat generated within the system.

30 Claims, 3 Drawing Figures

PRESSURIZED HIGH TEMPERATURE FUEL CELL POWER PLANT WITH BOTTOMING CYCLE

BACKGROUND OF THE INVENTION

1. Field of Invention

This invention relates to electricity generating power plants and more particularly to fuel cell power plants.

2. Description of the Prior Art

With today's dwindling fuel supplies, considerable effort is presently being put forth on the development of more efficient methods for generating power. Nuclear power, solar power and fuel cell power are but a few of the avenues being explored. With regard to fuel cells, significant advances have recently been made as evidenced by the fuel cell power plants described in U.S. Pat. Nos. 3,973,993; 4,001,041; 3,976,506; 3,982,962; 3,972,731; 4,004,947; and 3,976,507, all filed on Feb. 12, 1975, and of common assignee with the present application. In the power plants described by these applications the key to success was the pressurizing of the power plants utilizing turbochargers driven by what would normally be wasted energy produced in the power plant. Yet, despite the many advantages associated with these power plants, their overall efficiency is only about the same as the most efficient steam turbine power plants presently used by the utility companies.

It is well known in the art that combined cycle power plants can improve the overall efficiency of many types of power producers by utilizing what would otherwise be waste energy in a bottoming cycle.

SUMMARY OF THE INVENTION

One object of the present invention is a highly efficient power plant for generating electrical energy.

Another object of the present invention is a highly efficient combined cycle power plant using fuel cells as the primary source of power.

Accordingly, the present invention is a high temperature fuel cell power plant at least a portion of the fuel cell oxidant effluent is recycled and another portion of the oxidant effluent drives a turbocharger for compressing the oxidant used in the cells. In a preferred embodiment the power plant is a combined cycle power plant including a bottoming cycle wherein the bottoming cycle is powered by heat energy from the oxidant effluent and from the turbocharger exhaust.

Recovering and making use of fuel cell waste heat is certainly not novel as is evidenced by the several commonly owned patent applications discussed in the description of the prior art. Such a suggestion can also be found in U.S. Pat. No. 3,488,226 to Baker et al. For example, in Baker et al molten carbonate fuel cells provide the heat used in an embodiment reformer which produces the fuel for the fuel cells. Furthermore, it is suggested that heat in the fuel cell anode effluent may be recovered and used to produce the steam needed by the reformer, or it may be burned and used to preheat the unprocessed fuel prior to its delivery into the reformer. There is no suggestion, however, that there is sufficient heat to power a separate bottoming cycle; and, in any event, it is not obvious from Baker et al as to how this could be efficiently accomplished or that it could be accomplished at all.

In a preferred embodiment of the present invention an exothermic fuel reactor is provided with pressurized oxidant from a turbocharger and with raw fuel. Processed fuel from the reactor is delivered to the fuel or anode side of molten carbonate fuel cells. Effluent from the anode site of the cells is combusted in a burner with pressurized oxidant from a turbocharger and the burner products, including excess oxidant for use in the fuel cells, are fed to the oxidant or cathode side of the cells along with recycled oxidant effluent. A portion of the oxidant effluent is not recycled but is used to power the turbocharger. In this embodiment the bottoming cycle is powered by heat energy from the exothermic reactor as well as from the recycled oxidant effluent and from the turbocharger exhaust. Preferably the reactor is a fuel gasifier which is able to burn almost any fossil fuel, and the bottoming cycle is a steam driven turbogenerator. It is estimated that an overall power plant efficiency of up to 50% may be achieved with a power plant having components arranged according to the present invention as compared to the 40% efficiency of the most efficient, operational power plants of today.

The foregoing and other objects, features, and advantages of the present invention will become more apparent in the light of the following detailed description of preferred embodiments thereof as illustrated in the accompanying drawing.

DESCRIPTION OF THE PREFERRED EMBODIMENTS

Figure 1:
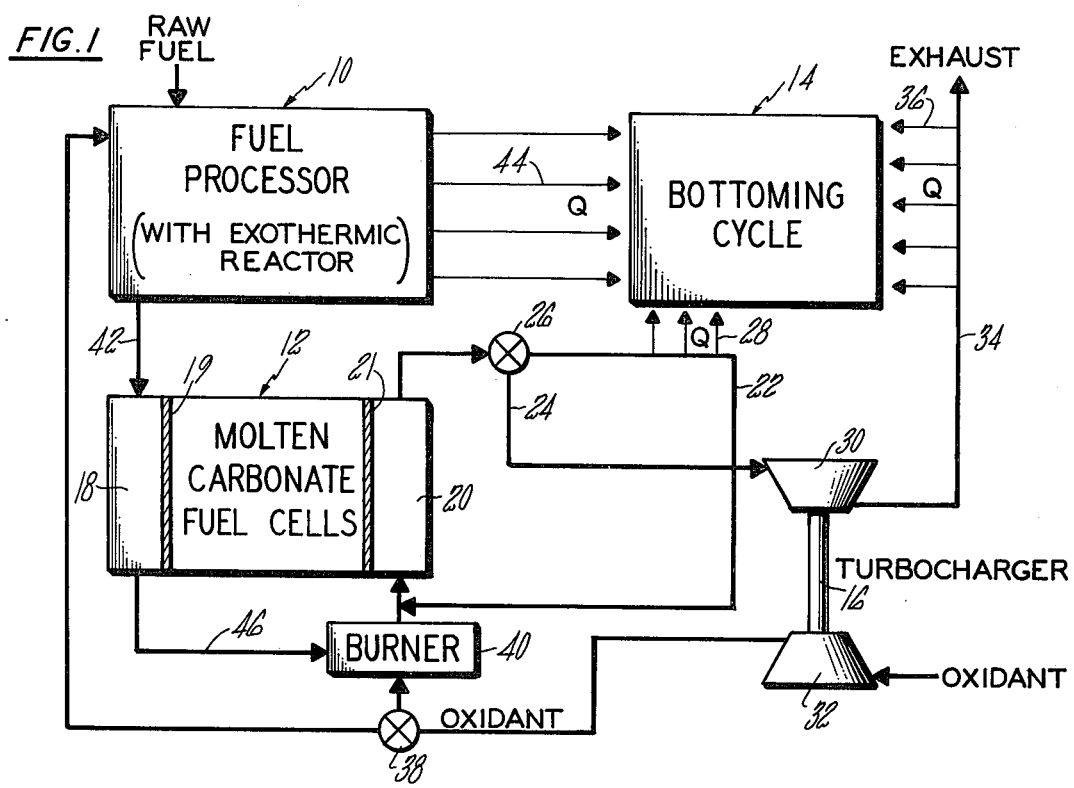
FIG. 1 is a simplified schematic of a combined cycle power plant according to one embodiment of the present invention.

Referring to FIG. 1, a simplified version of a combined cycle power plant according to the present invention is shown schematically. The power plant includes four basic building blocks: the fuel processing apparatus 10, a plurality of series connected fuel cells 12 (only one being shown for simplicity), apparatus constituting a bottoming cycle 14 and one or more turbochargers 16. As will hereinafter become apparent, the components or building blocks are carefully integrated so as to make maximum use of the energy generated, all toward the goal of producing useful electrical energy. Basically, the bottoming cycle 14 serves as a receptacle for energy generated elsewhere in the power plant, and converts that energy (generally in the form of heat energy) into additional electrical energy.

In this particular embodiment the fuel cells 12 are the well known molten carbonate fuel cells which are herein assumed to operate between 1100° and 1300° F. Actually, any type of high temperature fuel cells which operate at temperatures greater than about 800° F (preferably greater than 1000° F) are suitable for power plants of the present invention. As shown in the drawing, the cell 12 includes a fuel space 18 which is positioned behind an anode electrode 19, and an oxidant space 20 which is positioned behind a cathode electrode 21. The oxidant space effluent, which is assumed to be at a temperature of about 1300° F, is the basic source of energy for the bottoming cycle 14 and a turbocharger 16. The effluent is divided into a recycle portion 22 and an exhaust portion 24 by a valve 26 or other suitable means. Heat is transferred from the recycle portion 22 directly to the bottoming cycle as indicated by the arrows at 28. The recycle portion 22, now substantially cooled, is recycled through the oxidant space 20 as shown. The exhaust portion 24 is directed into the turbine 30 of the turbocharger 16 which drives the compressor 32. In the turbine 30 the temperature and pressure of the effluent is substantially reduced; however, the exhaust 34 from the turbine 30 still contains a large amount of high quality heat energy which is transferred to the bottoming cycle as indicated by the arrows 36. The compressor 32 compresses an oxidant (preferably air, but perhaps low pressure oxygen) part of which is delivered to a burner 40 and part of which is delivered to the fuel processing apparatus 10 by a valve 38. In the fuel processing apparatus raw fuel is burned with the pressurized oxidant in an exothermic reactor to produce a hydrogen containing fuel gas which is delivered from the fuel processing apparatus 10 into the fuel space 18 as indicated by the arrow 42. In addition to the reactor, the fuel processing apparatus 10 most likely will include other devices for increasing the yield of hydrogen from the raw fuel and for removing undesirable constituents from the fuel, such as sulfur and sulfur compounds. Excess heat generated by the exothermic reactor is transferred to the bottoming cycle as is indicated by the arrows 44.

Effluent from the fuel space 18 is delivered into the burner 40 as indicated by the arrow 46. There are two basic reasons for doing this. The first is that the fuel effluent contains some unburned hydrogen (as well as other burnable constituents) which is used in the burner 40 to heat the incoming oxidant stream to a temperature sufficiently high for proper fuel cell operation. Secondly, as will be hereinafter explained in more detail, the fuel effluent includes carbon dioxide generated by the reaction within the fuel cells which must be replenished at the cathode for proper cell operation.

Figure 2:
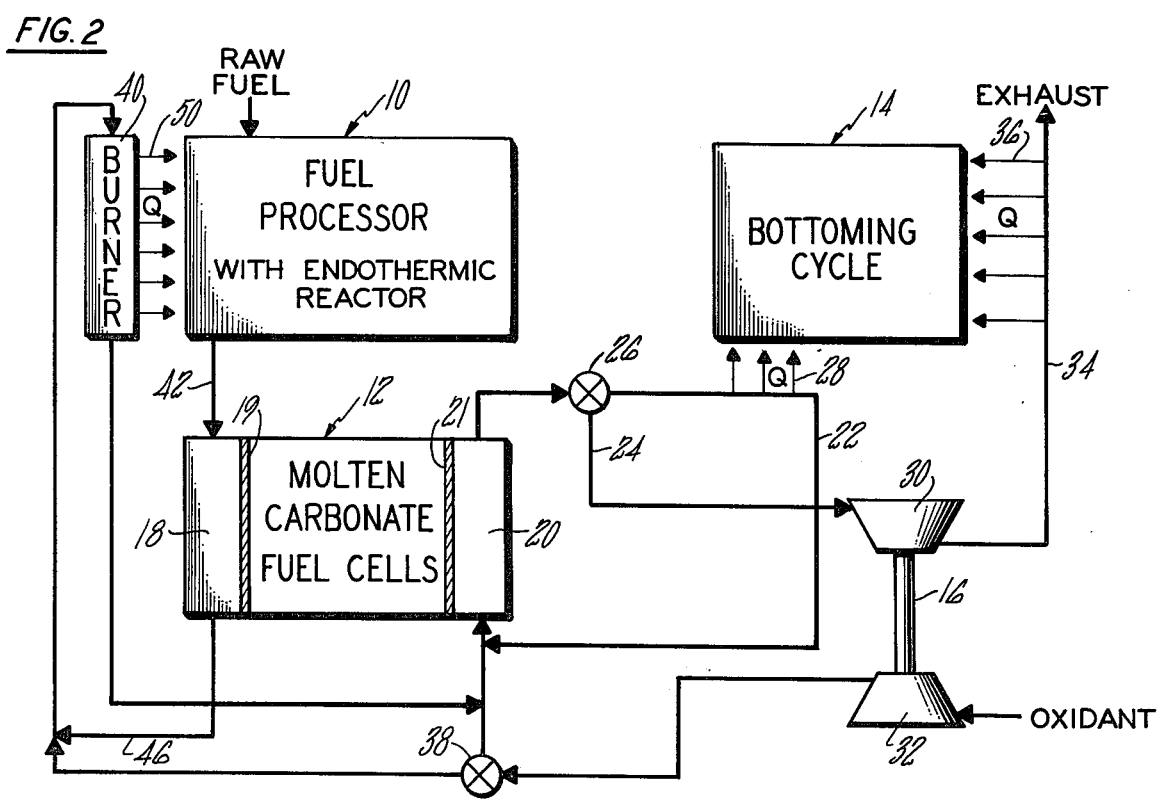
FIG. 2 is a simplified schematic of a combined cycle power plant according to another embodiment of the present invention.

While the power plant of FIG. 1 includes an exothermic fuel processing reactor which generates excess heat, the power plant of FIG. 2 incorporates an endothermic fuel processing reactor which requires heat in order to operate. Referring now to FIG. 2, components which are analogous or identical to those of FIG. 1 have been given similar reference numerals. In the power plant of FIG. 2 the burner 40 is used to provide the heat needed by the endothermic reactor. This heat transfer is depicted schematically by the arrows 50. No pressurized oxidant is delivered into the fuel processing apparatus; however, some is delivered directly into the oxidant space 20, bypassing the burner 40. No heat is transferred from the fuel processing apparatus to the bottoming cycle. In all other respects the power plant is the same as that of FIG. 1. For example, note that the effluent from the fuel space 18 and pressurized oxidant from the turbocharger 16 are still delivered into the burner 40, and the burner effluent is still delivered into the oxidant space 20.

Figure 3:
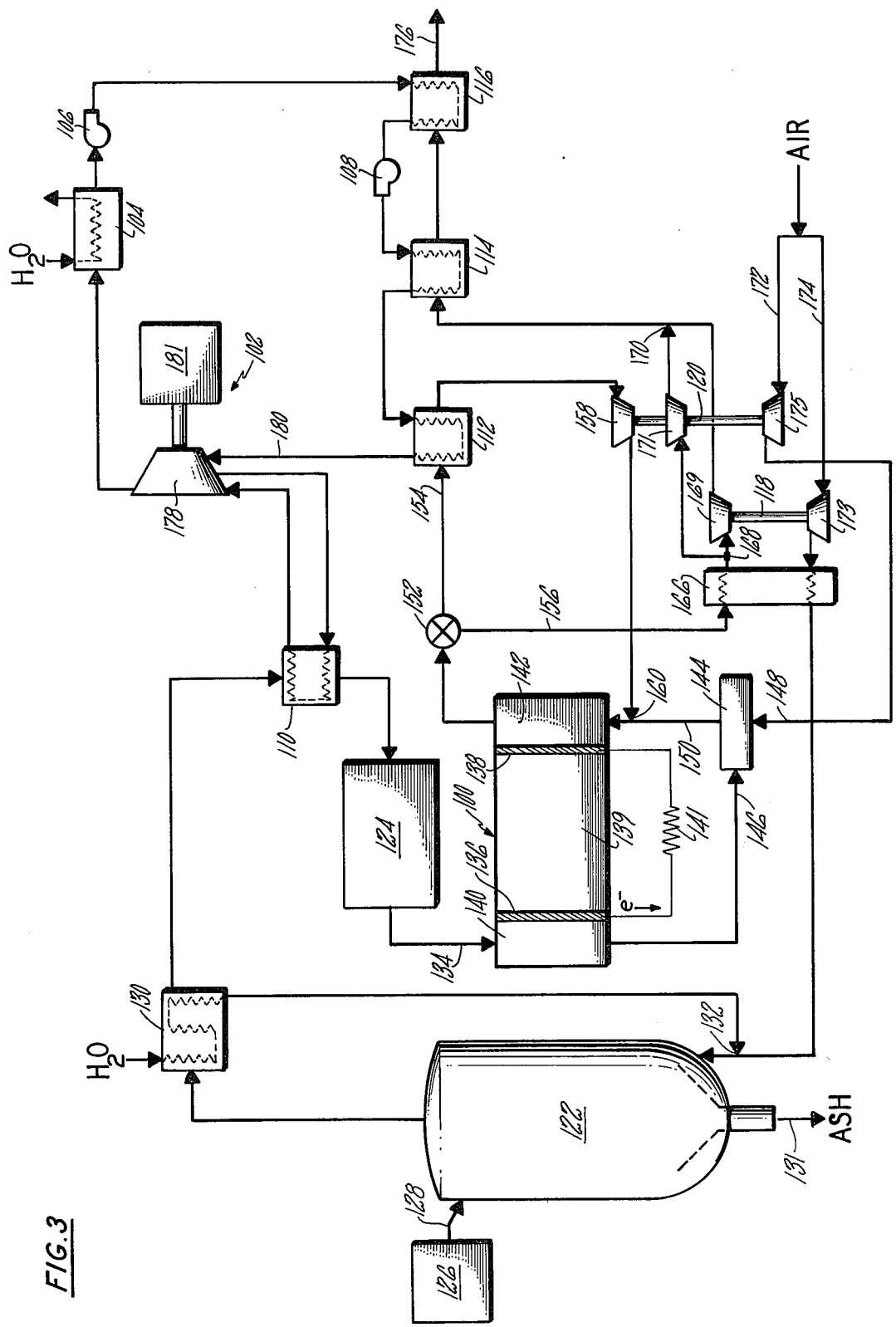
FIG. 3 is a more complete schematic of a combined cycle power plant similar to the power plant of FIG. 1.

FIG. 3 is a more detailed schematic of a power plant similar to the power plant depicted in FIG. 1. Temperatures given hereinafter regarding operation of the power plant are merely exemplary based on numerous assumptions such as the specific design of the apparatus used, its size and exact location in the power plant, estimates of efficiencies, the type of raw fuel and mass flow rates. They are generally realistic, but are only provided to give a picture of relative temperatures at various locations in the power plant.

In FIG. 3 the fuel cells, which are actually one or more stacks of series connected molten carbonate cells, are designated by the numeral 100. The bottoming cycle includes a steam turbine generator 102, condenser 104, and pumps 106, 108. Heat exchangers 110, 112, 114, and 116 extract heat from various locations in the power plant for use in the bottoming cycle as will be more fully explained hereinafter. A pair of turbochargers 118, 120 provide the pressurized oxidant used in the fuel cells and fuel processing apparatus. The fuel processing apparatus includes a fuel gasifier 122 and sulfur removal apparatus 124. In this embodiment it shall be considered that coal is the raw fuel and the fuel gasifier is a coal gasifier; however, it should be apparent to those with ordinary skill in the art that the type of fuel used will depend upon the type of fuel processing apparatus. As used in the specification and appended claims, the term "raw fuel" is intended to mean any fossil fuel. Fuel gasifiers presently known in the art are able to operate on virtually any fossil fuel. Coal is chosen for this embodiment in view of its relatively low cost and wide availability.

An important aspect of the power plant of the present invention is the operation of the fuel cells and fuel processing apparatus at elevated pressures. Elevated pressures significantly improve fuel cell performance by increasing reactant partial pressures. High pressures also significantly reduce the size of the fuel processing apparatus. In the embodiment of FIG. 3 a pressure of about 150 psia was selected because it provides good cell performance while holding gasifier methane production low. Methane in the fuel gas is undesirable since it cannot be combusted in the fuel cell and reduces the amount of available $H_2$, which can be combusted. Actually, any pressure at least as high as about two atmospheres may be used, however, the lower pressures may require larger fuel cells and fuel processing apparatus, thereby perhaps making the power plant economically unattractive.

In operation, coal, which has been crushed into particles no greater than one-quarter inch in diameter, is fed from storage and preparation apparatus 126 into the coal gasifier 122 as depicted by the arrow 128. The coal gasifier 122 is basically an exothermic reactor which rapidly gasifies the coal to produce a gas stream rich in hydrogen and carbon monoxide with small quantities of methane; other constituents such as hydrogen sulfide and nitrogen are also present in the gasifier effluent. In the gasifier the coal is contacted with a mixture of superheated steam and air at a pressure of about 235 psia. The pressurized air comes from the turbocharger 118 and is mixed at 132 with superheated steam (about 1000° F at 235 psia) from a boiler 130. Heat for the boiler 130 is provided by the effluent from the gasifier which may be at a temperature of about 1900° F and at a pressure of about 200 psia. The principal reactions taking place in the fluidized bed gasifier are as follows:

$$C + H_2O \rightarrow CO + H_2 - \text{Heat} \tag{1}$$

$$C + CO_2 \rightarrow 2CO - \text{Heat} \tag{2}$$

$$C + 2H_2 \rightarrow CH_4 + \text{Heat} \tag{3}$$

$$C + O_2 \rightarrow CO_2 + \text{Heat} \tag{4}$$

$$CO + H_2O \rightarrow CO_2 + H_2 + \text{Heat} \tag{5}$$

Ash produced in the gasifier falls to the bottom thereof and is removed by suitable means at 131 for disposal elsewhere.

After transferring heat to the boiler 130, the partially processed fuel stream is at a temperature of about 1500° F. Additional heat energy in the fuel stream is transferred from the fuel stream to the bottoming cycle by means of the heat exchanger 110. This will be explained later in more detail.

Upon leaving the heat exchanger 110 the temperature of the stream may be about 1120° F. Hydrogen sulfide and other sulfur compounds are then removed from the stream by the apparatus 124. This is done since significant amounts of sulfur compounds in the fuel may adversely affect the operation of the molten carbonate fuel cells and would contribute to environmental pollution by its presence in the power plant exhaust. Any type of sulfur removal apparatus which has the ability to reduce the sulfur content of the fuel stream to levels which are tolerable may be used. The fully processed fuel, at a temperature of about 1200° F and pressure of 155 psia, is then delivered to the fuel cells 100 as indicated by the arrow 134.

As hereinabove discussed, the fuel cells 100 are of the molten carbonate variety, each comprising an anode or fuel electrode 136, a cathode or oxidant electrode 138, and molten carbonate electrolyte trapped n a matrix 139 disposed between the electrodes. In operation, the processed fuel or fuel gas is fed to the anode 136 via the fuel space 140 and is substantially in the form of $H_2$ and CO plus small amounts of methane. The fuel gas also includes large amounts of $N_2$ from the air used in the fuel processor and also $H_2O$. At the anode the electrochemical oxidation of $H_2$ occurs as follows:

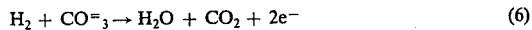
(6)

Simultaneously, CO is constantly being shifted in the fuel space 140 to make additional $H_2$, so that the composition across the cell remains in water-gas shift equilibrium. The shifting is represented by the following equation:

(7)

Thus, the $H_2$, either present in the inlet fuel gas or as a result of the water-gas shift, reacts with the carbonate ion $CO^=_3$ to form by-product $H_2O$ and $CO_2$, with an electric current produced. The electrons are conducted through a load 141 and back to the cathode in a manner well known to those skilled in the art. At the cathode, oxygen from pressurized air, and by-product $CO_2$ from the anode reaction, combine electrochemically with the electrons to form the carbonate ion as follows:

(8)

The carbonate ion thus formed is conducted across the electrolyte and recombines with $H_2$, completing the cycle. As indicated, the $CO_2$ formed at the anode must be transferred to the cathode. This can be done, perhaps, by separating the $CO_2$ from the fuel space effluent and introducing that $CO_2$ into the oxidant space. However, in the present embodiment, the effluent from the fuel space 140 is first delivered to a burner 144 as indicated by the arrow 146. This stream may be about 1300° F and includes $N_2$, $H_2O$, $CO_2$ and unburned $H_2$, CO, and methane. Air from the turbocharger 120 at a pressure of about 150 psia is also delivered into the burner as indicated by the arrow 148. Enough air is supplied to completely combust the $H_2$, CO and methane in the fuel space effluent and to provide sufficient oxidant for the fuel cell reaction. The $CO_2$ does not burn and exits in the burner effluent. The burner effluent is combined with cooled recycled oxidant space effluent at 160 and is delivered into the oxidant space 142 as indicated by the arrow 150. The burner 144 in this embodiment is a catalytic burner which may, for example, utilize a precious metal catalyst, such as platinum, on a ceramic material. Other types of burners may also be used.

The oxidant space effluent leaves the cells at approximately 1300° F. At a valve 152 or other suitable means the effluent is split into two streams, a recycle stream as indicated by the arrow 154, and an exhaust stream as indicated by the arrow 156. The best split for a particular power plant will depend on several factors and is herein below explained in further detail. Heat energy in the recycle portion 154 is transferred to the bottoming cycle by the heat exchanger 112. The stream temperature leaving the heat exchanger 112 may be about 900° F. A recycle pump 158, which receives shaft power from the turbocharger 120, circulates this gas stream. The recycle gas stream is combined at 160 with the effluent from the burner 144 before it is returned to the oxidant space 142.

The exhaust portion 156 of the oxidant space effluent is first delivered into a heat exchanger 166 for the purpose of boosting the temperature of the pressurized air stream being delivered from the turbocharger 118 to the coal gasifier 122 to about 1000° F. It is then divided at 168 and directed into the turbine portions 169, 171 of the turbochargers 118, 120, respectively. The turbines, in turn, drive the compressor portions 173, 175 of the turbochargers which pressurize the air entering at 172 and 174. The exhausts from the turbines 169, 171 are combined at 170, at which point their temperature may be about 725° F. The combined exhaust is thereupon delivered to the heat exchangers 114, 116 and exhausted to atmosphere, as indicated by the arrow 176, at a temperature of about 240° F.

As shown in Eq. 8, the cathode reaction requires twice as much $CO_2$ as $O_2$. Actually, a higher partial pressure of $CO_2$ in the oxidant space promotes the reaction and improves the cell performance. From this point of view, the pressurized air flow rate from the turbocharger into the burner should be minimized, but should be at least enough to provide an adequate level of $O_2$ partial pressure across the cell. Also, since the flow through the oxidant space is used to remove heat from the cell, its inlet temperature and flow rate are critical. It is, furthermore, desirable to maintain a low thermal gradient across the cell; thus, for a 1200° F cell, it is preferred to have an oxidant space inlet temperature of about 1100° F and an outlet temperature of about 1300° F. The low thermal gradient necessitates a relatively high mass flow rate to remove the heat.

In a power plant according to the present invention the cooled recycle stream (i.e., at about 900° F leaving the heat exchanger 112) provides the bulk of the mass flow, reduces the burner effluent temperature to the proper level, and actually increases the partial pressure of $CO_2$ in the burner effluent due to its high $CO_2$ content. The temperature of the stream 150 may be readily controlled by controlling the temperature of the recycle stream as it leaves the heat exchanger 112, such as by means (not shown) bypassing a portion of the recycle stream around the heat exchanger. Without the recycle stream additional pressurized air from the turbocharger (at about 660° F) would have to be pushed through the oxidant space (probably bypassing the burner). The additional air would cool the burner effluent and provide the necessary mass flow rate through the oxidant space; however, it would reduce the ratio of $CO_2$ to $O_2$ to an unacceptably low value.

The split ratio at the valve 152 is determined, for the most part, by the energy requirements of the turbochargers and the necessity to vent enough oxidant space effluent to keep the system in mass balance. It is desirable to minimize the flow rate into the turbochargers to the extent possible and maximize the flow rate into the heat exchanger 112 since it is more efficient to transfer heat to the bottoming cycle using the high temperature, high pressure recycle stream than the low temperature, low pressure turbine exhaust stream. In the present embodiment it is assumed that about two-thirds of the oxidant space effluent is recycled; however, as mentioned above the best split for a particular power plant will depend on at least the several factors discussed above.

In the bottoming cycle, steam from the heat exchanger 112 at a pressure of about 2400 psig and a temperature of 1000° F is fed into the stream turbine portion 178 of the steam turbine-generator 102 as indicated by the arrow 180. The steam is expanded, reheated to 1000° F in the heat exchanger 110 using sensible heat from cooling the gasifier product gases prior to desulfurization, returned to the turbine, and again expanded to on the order of about 2 inches of mercury at a saturation temperature of about 100° F. The turbine drives an electric generator 181 to produce electricity. Although in this embodiment the heat provided by the gasifier 122 is transferred to the bottoming cycle by a heat exchanger in the gasifier product gas stream and is used to reheat already expanded steam, it should be apparent to persons having ordinary skill in the art that heat may instead be extracted and transferred at other locations, such as by passing steam from the heat exchanger 112 into direct heat exchanger relationship with the gasifier 122. Many variations are possible.

The steam turbine exhaust is condensed in the water cooled condensing unit 104. The condensate leaves the condenser 104 and is pumped by condensate pump 106 to the heat exchanger 116, which in this embodiment is a deaerator receiving heat from the turbocharger turbine exhaust stream. The feed water is then pumped to a very high pressure, such as on the order of 2600 psig, by an electric pump 108 and is preheated in the heat exchanger 114 to a temperature of about 550° F, somewhat below saturation. The heat for preheating is also taken from the turbocharger turbine exhaust stream. The preheated water is then fed to the heat exchanger 112, which is basically a boiler/superheater, where steam for throttle conditions of 2400 psig and 1000° F is raised. The heat for this step is provided by fuel cell waste heat transferred from the recycle portion of the oxidant space effluent. This completes the bottoming cycle.

In this embodiment the fuel cells generate approximately two-thirds of the electric power while the bottoming cycle generates the remaining one-third. About 86% of the heat used to power the bottoming cycle is from the fuel cells, the remainder being taken from the excess heat generated by the fuel gasifier. About two-thirds of the fuel cell exhaust heat is transferred to the bottoming cycle from the oxidant recycle portion and the remaining one-third from the turbocharger exhaust. If the fuel processing reactor were endothermic, such as in the embodiment of FIG. 2, virtually all of the energy for the bottoming cycle would necessarily be supplied by the fuel cell exhaust heat.

The bottoming cycle of FIG. 3 is shown as a steam-turbine generator. However, although less efficient for the purposes of the present invention, a gas turbine generator could be used as the bottoming cycle. Actually, there is no intention to exclude any type of bottoming cycle from being within the scope of the present invention.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. A fuel cell power plant comprising:
   a plurality of molten carbonate fuel cells connected electrically in series, each cell including means defining a fuel space and means defining an oxidant space;
   turbocharger means including first turbine means operably connected to a compressor for driving said compressor;
   second turbine means operably connected to an electric generator;
   burner means disposed downstream of said fuel space for burning fuel space effluent;
   means for delivering pressurized, processed fuel into said fuel space including fuel processing apparatus disposed upstream of said fuel space;
   means for delivering raw fuel into said fuel processing apparatus;
   means for delivering pressurized oxidant from said turbocharger means and effluent from said fuel space into said burner means;
   means for delivering effluent from said burner means into said oxidant space;
   means for dividing the oxidant space effluent into a first portion and a second portion and for recycling said first portion through said oxidant space and for delivering said second portion into said first turbine means for driving said compressor; and
   means for transferring heat energy from the oxidant space effluent to said second turbine means to drive said electric generator, including means for transferring heat energy from the first turbine means exhaust gases to said second turbine means.

2. The fuel cell power plant according to claim 1 wherein said fuel processing apparatus includes an exothermic fuel reactor, said power plant also including means for delivering pressurized oxidant from said turbocharger means into said exothermic fuel reactor and means disposed upstream of said fuel space for transferring heat energy generated by said reactor to said second turbine means to drive said electric generator.

3. The fuel cell power plant according to claim 2 wherein said exothermic fuel reactor is a fuel gasifier, said power plant including means for delivering steam into said fuel gasifier.

4. The fuel cell power plant according to claim 3 wherein said fuel gasifier is a coal gasifier.

5. The fuel cell power plant according to claim 1 wherein the oxidant is air and said means for transferring heat energy from the oxidant space effluent to said second tubine means includes means for transferring heat energy from said first portion of the oxidant space effluent to said second turbine means.

6. The fuel cell power plant according to claim 1 wherein said second turbine means is a steam driven turbine.

7. The fuel cell power plant according to claim 1 wherein said fuel processing apparatus includes an endothermic fuel reactor and wherein said burner means is disposed in association therewith to provide heat to said reactor.

8. The fuel cell power plant according to claim 2 wherein said means for transferring heat energy generated by said reactor to said second turbine means is disposed downstream of said exothermic reactor and in heat exchange relationship with the effluent from said reactor.

9. The fuel cell power plant according to claim 5 wherein said second turbine means comprises a steam turbine, said means for transferring heat energy from said first portion of the oxidant space effluent to said second turbine means includes a boiler in heat exchange relationship with said oxidant space effluent for generating superheated steam, and means for delivering said superheated steam into said steam turbine.

10. The fuel cell power plant according to claim 9 wherein said means for transferring heat energy from the first turbine means exhaust gases to said second turbine means includes heat exchanger means for preheating water, said heat exchanger means being disposed in heat exchange relationship with the second turbine exhaust gases, and means for delivering said preheated water from said heat exchanger means to said boiler.

11. A fuel cell power plant comprising:
a plurality of molten carbonate fuel cells connected electrically in series, each cell including means defining a fuel space and means defining an oxidant space;
turbocharger means including a turbine operably connected to a compressor for driving said compressor;
an exothermic fuel processing reactor disposed upstream of said fuel space;
burner means disposed downstream of said fuel space and upstream of said oxidant space;
steam turbine means operably connected to an electric generator;
means for delivering raw fuel into said reactor;
means for delivering pressurized oxidant from said turbocharger means into said reactor;
means for delivering pressurized, processed fuel from said reactor into said fuel space;
means for delivering pressurized oxidant from said turbocharger means and effluent from said fuel space into said burner means;
means for delivering effluent from said burner means into said oxidant space;
means disposed downstream of said oxidant space for splitting said oxidant space effluent into a recycle portion and an exhaust portion;
means for recycling the recycle portion through said oxidant space;
means for delivering the exhaust portion into said turbocharger means;
first heat exchanger means in heat exchange relationship with said recycle portion and with the turbocharger exhaust gases for converting water to steam and for superheating said steam;
means for delivering said superheated steam from said first heat exchanger means into said steam turbine;
second heat exchanger means disposed upstream of said fuel space and in heat exchange relationship with the heat generated by said reactor for superheating steam; and
means for delivering the superheated steam from said second heat exchanger means into said steam turbine.

12. The fuel cell power plant according to claim 11 wherein the oxidant is air.

13. The fuel cell power plant according to claim 12 wherein said exothermic fuel reactor is a fuel gasifier, said power plant including means for delivering steam into said fuel gasifier.

14. The fuel cell power plant according to claim 13 wherein said fuel gasifier is a coal gasifier.

15. In the method of operating a fuel cell power plant, the power plant comprising a plurality of molten carbonate fuel cells connected electrically in series, each cell including means defining a fuel space and means defining an oxidant space, turbocharger means including first turbine means operably connected to a compressor, second turbine means operably connected to an electric generator, burner means, and fuel processing apparatus, the steps of:
delivering raw fuel into the fuel processing apparatus;
processing the raw fuel in said apparatus including producing hydrogen from the raw fuel;
delivering the hydrogen produced into the fuel space;
pressurizing an oxidant in the turbocharger means and delivering pressurized oxidant from the turbocharger means into the burner means;
delivering the fuel space effluent into the burner means and burning the effluent therein;
delivering the burner means effluent into the oxidant space;
recycling a first portion of the oxidant space effluent through the oxidant space;
delivering a second portion of the oxidant space effluent into said first turbine means for driving the compressor; and
transferring heat energy from the oxidant space effluent to said second turbine means including the step of transferring heat energy from said first turbine means exhaust gases to said second turbine means.

16. The method according to claim 15 wherein the fuel processing apparatus includes an exothermic fuel reactor, including the steps of:
delivering pressurized oxidant from the turbocharger means into the exothermic fuel reactor; and
transferring heat energy generated by the reactor to said second turbine means.

17. The method according to claim 15 wherein the oxidant includes air and the step of transferring heat energy from the oxidant space effluent to said second turbine means includes the step of transferring heat energy from the first portion of the oxidant space effluent to said second turbine means.

18. The method according to claim 17 wherein said second turbine means includes a steam driven turbine, and the step of transferring heat energy from the oxidant space effluent to said second turbine means includes converting water to steam and delivering the steam to said steam driven turbine.

19. The method according to claim 18 including the steps of expanding said steam in said steam turbine, delivering the expanded steam into heat exchange relationship with the heat generated by the reactor to reheat the steam, returning the reheated steam to said steam turbine and expanding the reheated steam in said steam turbine.

20. The method according to claim 17 wherein the fuel processing apparatus includes an endothermic reactor, including the step of transferring heat from the burner means to the endothermic reactor.

21. In the method of operating a fuel cell power plant, the power plant comprising a plurality of molten carbonate fuel cells connected electrically in series, each cell including means defining a fuel space and means defining an oxidant space, turbocharger means including first turbine means operably connected to a compressor, second turbine means operably connected to an electric generator, burner means, and fuel processing apparatus, the steps of:
delivering raw fuel into the fuel processing apparatus;
processing the raw fuel including producing hydrogen from the raw fuel;
delivering the hydrogen produced into the fuel space;
pressurizing air in the turbocharger means and delivering the pressurized air from the turbocharger means into the oxidant space;
delivering $CO_2$ from the fuel space effluent into the oxidant space;
delivering the fuel space effluent into the burner means and burning the effluent therein;
recycling a first portion of the oxidant space effluent through the oxidant space;
using the heat generated by the burner means to heat the gases being delivered into the oxidant space;
delivering a second portion of the oxidant space effluent into said first turbine means for powering said first turbine means; and
transferring heat energy from the oxidant space effluent to said second turbine means including the steps of transferring heat energy from said first turbine means exhaust gases to said second turbine means.

22. The method according to claim 21 wherein the fuel processing apparatus includes an exothermic fuel reactor, including the steps of:
delivering pressurized air from the turbocharger into the exothermic fuel reactor;
transferring heat energy generated by the reactor to said second turbine means; and
wherein the step of transferring heat energy from the oxidant space effluent to said second turbine means includes the step of transferring heat energy from the first portion of the oxidant space effluent to said second turbine means.

23. In a fuel cell power plant comprising a plurality of molten carbonate fuel cells connected electrically in series, each cell including means defining a fuel space and means defining an oxidant space, turbocharger means including first turbine means operably connected to a compressor for driving said compressor, burner means disposed downstream of said fuel space for burning fuel space effluent, means for delivering pressurized, processed fuel into said fuel space including fuel processing apparatus disposed upstream of said fuel space, means for delivering raw fuel into said fuel processing apparatus, means for delivering pressurized oxidant from said turbocharger means and effluent from said fuel space into said burner means, the improvement comprising:
means for delivering effluent from said burner means into said oxidant space; and
means for dividing the oxidant space effluent into a first portion and a second portion and for recycling said first portion through said oxidant space and for delivering said second portion into said first turbine means for driving said compressor.

24. The improvement according to claim 23 wherein said means for recycling said first portion through said oxidant space includes means for mixing said first portion with said burner exhaust upstream of said oxidant space.

25. The improvement according to claim 24 including second turbine means operably connected to an electric generator and means for transferring heat energy from the oxidant space effluent to said second turbine means to drive said electric generator.

26. The improvement according to claim 24 including second turbine means operably connected to an electric generator, means for transferring heat energy from said first portion of said oxidant space effluent and from said first turbine means exhaust gases to said second turbine means.

27. The improvement according to claim 26 wherein said fuel processing apparatus includes an exothermic fuel reactor, means for delivering pressurized oxidant from said turbocharger means into said exothermic fuel reactor, and means disposed upstream of said fuel space for transferring heat energy generated by said reactor to said second turbine means to drive said electric generator.

28. In the method of operating a fuel cell power plant, the power plant comprising a plurality of molten carbonate fuel cells connected electrically in series, each cell including means defining a fuel space and means defining an oxidant space, turbocharger means including first turbine means operably connected to a compressor, second turbine means operably connected to an electric generator, burner means, and fuel processing apparatus, the steps of:
delivering raw fuel into the fuel processing apparatus;
processing the raw fuel in said apparatus including producing hydrogen from the raw fuel;
delivering the hydrogen produced into the fuel space;
pressurizing an oxidant in the turbocharger means and delivering pressurized oxidant from the turbocharger means into the burner means;
delivering the fuel space effluent into the burner means and burning the effluent therein;
delivering the burner means effluent into the oxidant space;
recycling a first portion of the oxidant space effluent through the oxidant space;
dividing the oxidant space effluent into a first portion and a second portion;
recycling said first portion through said oxidant space; and
delivering said second portion into said first turbine means for driving the compressor.

29. The method according to claim 28 wherein said step of recycling includes mixing said first portion with the burner exhaust upstream of said oxidant space.

30. The method according to claim 29 wherein the power plant also includes second turbine means operably connected to an electric generator, the additional steps of transferring heat energy from said first portion and from said first turbine means exhaust gases to said second turbine means for driving said electric generator.

* * * * *